(12) United States Patent
Buras et al.

(10) Patent No.: US 7,608,650 B2
(45) Date of Patent: Oct. 27, 2009

(54) BITUMEN/RUBBER COMPOSITIONS CROSSLINKED WITH POLYTHIOMORPHOLINES, POLYSULFIDES AND/OR MERCAPTOBENZIMIDAZOLE

(75) Inventors: Paul Buras, Houston, TX (US); William Lee, Humble, TX (US); James Butler, League City, TX (US); Wendy Stanley, Webster, TX (US)

(73) Assignee: Fina Technology, Inc., Houston, TX (US)

( * ) Notice: Subject to any disclaimer, the term of this patent is extended or adjusted under 35 U.S.C. 154(b) by 0 days.

(21) Appl. No.: 12/367,303

(22) Filed: Feb. 6, 2009

(65) Prior Publication Data

US 2009/0143504 A1 Jun. 4, 2009

Related U.S. Application Data

(63) Continuation of application No. 11/001,361, filed on Dec. 1, 2004, now abandoned, which is a continuation-in-part of application No. 10/749,898, filed on Dec. 31, 2003.

(51) Int. Cl.
*C08L 95/00* (2006.01)

(52) U.S. Cl. .............................. 524/68; 524/69; 524/70; 524/71

(58) Field of Classification Search ............... 524/68–71
See application file for complete search history.

(56) References Cited

U.S. PATENT DOCUMENTS 5,698,651 A * 12/1997 Kawasaki et al. ........... 526/336
2005/0145137 A1* 7/2005 Buras et al. ............... 106/284.3

* cited by examiner

*Primary Examiner*—Peter Szekely
(74) *Attorney, Agent, or Firm*—Tenley R. Krueger

(57) ABSTRACT

Asphalt and elastomeric polymer compositions crosslinked with mixed polythiomorpholines or at least one alkyl polysulfide can give polymer modified asphalts (PMAs) with improved properties and/or reduced $H_2S$ evolution. When at least one alkyl polysulfide is used to completely or partially replace conventional crosslinkers such as S or MBT, mercaptobenzimidazole (MBI) may be optionally used as a co-crosslinker. The use of mixed polythiomorpholines as crosslinkers provide PMAs with better low temperature profiles (BBR m-values). The use of at least one alkyl polysulfide crosslinker gives PMAs with improved PAV-aged DSR results, and reduced $H_2S$ evolution. The use of at least one alkyl polysulfide crosslinker together with MBI may give PMAs with improved PAV DSR Fail Temperatures.

13 Claims, No Drawings

BITUMEN/RUBBER COMPOSITIONS CROSSLINKED WITH POLYTHIOMORPHOLINES, POLYSULFIDES AND/OR MERCAPTOBENZIMIDAZOLE

FIELD OF THE INVENTION

This application is a continuation of U.S. patent application Ser. No. 11/001,361, filed Dec. 1, 2004, now abandoned, which is a CIP of U.S. patent application Ser. No. 10/749,898, filed Dec. 31, 2003, currently pending.

BACKGROUND OF THE INVENTION

The use of bitumen (asphalt) compositions in preparing aggregate compositions (including, but not just limited to, bitumen and rock) useful as road paving material is complicated by at least three factors, each of which imposes a serious challenge to providing an acceptable product. First, the bitumen compositions must meet certain performance criteria or specifications in order to be considered useful for road paving. For example, to ensure acceptable performance, state and federal agencies issue specifications for various bitumen applications including specifications for use as road pavement. Current Federal Highway Administration specifications require a bitumen (asphalt) product to meet defined parameters relating to properties such as viscosity, stiffness, penetration, toughness, tenacity and ductility. Each of these parameters defines a critical feature of the bitumen composition, and compositions failing to meet one or more of these parameters will render that composition unacceptable for use as road pavement material.

Conventional bitumen compositions frequently cannot meet all of the requirements of a particular specification simultaneously and, if these specifications are not met, damage to the resulting road may occur, including, but not necessarily limited to, permanent deformation, thermally induced cracking and flexural fatigue. This damage greatly reduces the effective life of paved roads.

In this regard, it has long been recognized that the properties of conventional bitumen compositions may be modified by the addition of other substances, such as polymers. A wide variety of polymers have been used as additives in bitumen compositions. For example, copolymers derived from styrene and conjugated dienes, such as butadiene or isoprene, are particularly useful, since these copolymers have good solubility in bitumen compositions and the resulting modified-bitumen compositions have good rheological properties.

It is also known that the stability of polymer-bitumen compositions may be increased by the addition of crosslinking agents (vulcanizing agents) such as sulfur, frequently in the form of elemental sulfur. It is believed that the sulfur chemically couples the polymer and the bitumen through sulfide and/or polysulfide bonds. The addition of extraneous sulfur is sometimes required to produce the improved stability, even though bitumens naturally contain varying amounts of native sulfur.

Thus, there are known processes for preparing a bitumen-polymer composition consisting of mixing a bitumen, at temperatures of about 266-446° F. (130-230° C.), with 2 to 20% by weight of a block or random copolymer, having an average molecular weight between 30,000 and 300,000. The resulting mixture is stirred for at least two hours, and then 0.1 to 3% by weight of sulfur relative to the bitumen is added and the mixture agitated for at least 20 minutes. The quantity of added sulfur may be from about 0.1 to 1.5% by weight with respect to the bitumen. The resulting bitumen-polymer composition is used for road-coating, industrial coating, or other industrial applications.

Similarly, there are also known asphalt (bitumen) polymer compositions obtained by hot-blending asphalt with about 0.1 to 1.5% by weight of elemental sulfur and about 2 to 7% by weight of a natural or synthetic rubber, which may be a linear butadiene/styrene copolymer. A process is additionally known for preparing a rubber-modified bitumen by blending rubber, either natural or synthetic, such as styrene/butadiene rubber, with bitumen at 2803-400° F. (138-204° C.), in an amount up to 10% by weight based on the bitumen, then adjusting the temperature to 257-320° F. (125-160° C.), and intimately blending into the mix an amount of sulfur such that the weight ratio of sulfur to rubber is between 0.01 and 0.9. A catalytic quantity of a vulcanization-accelerator is then added to effect vulcanization. A critical nature of the sulfur to rubber ratio is sometimes reported, for instance that weight ratios of sulfur to rubber of less than 0.01 gives modified bitumen of inferior quality.

A second factor complicating the use of bitumen compositions concerns the viscosity stability of such compositions under storage conditions. In this regard, bitumen compositions are frequently stored for up to 7 days or more before being used and, in some cases, the viscosity of the composition can increase so much that the bitumen composition is unusable for its intended purpose. On the other hand, a storage stable bitumen composition would provide for only minimal viscosity increases and, accordingly, after storage it may still be employed for its intended purpose.

Asphaltic concrete, typically including asphalt and aggregate, asphalt compositions for resurfacing asphaltic concrete, and similar asphalt compositions must exhibit a certain number of specific mechanical properties to enable their use in various fields of application, especially when the asphalts are used as binders for superficial coats (road surfacing), as asphalt emulsions, or in industrial applications. (The term "asphalt" is used herein interchangeably with "bitumen." Asphaltic concrete is asphalt used as a binder with appropriate aggregate added, typically for use in roadways.) The use of asphalt or asphalt emulsion binders either in maintenance facings as a surface coat or as a very thin bituminous mix, or as a thicker structural layer of bituminous mix in asphaltic concrete, is enhanced if these binders possess the requisite properties such as desirable levels of elasticity and plasticity.

As noted, various polymers have been added to asphalts to improve physical and mechanical performance properties. Polymer-modified asphalts (PMAs) are routinely used in the road construction/maintenance and roofing industries. Conventional asphalts often do not retain sufficient elasticity in use and, also, exhibit a plasticity range that is too narrow for use in many modern applications such as road construction. It is known that the characteristics of road asphalts and the like may be greatly improved by incorporating into them an elastomeric-type polymer which may be one such as butyl, polybutadiene, polyisoprene or polyisobutene rubber, ethylene/vinyl acetate copolymer, polyacrylate, polymethacrylate, polychloroprene, polynorbornene, ethylene/propylene/diene (EPDM) terpolymer and advantageously a random or block copolymer of styrene and a conjugated diene. The modified asphalts thus obtained commonly are referred to variously as bitumen/polymer binders or asphalt/polymer mixes or polymer modified asphalts (PMAs). PMAs and asphalt emulsions typically are produced utilizing styrene/butadiene based polymers, and typically have raised softening point, increased viscoelasticity, enhanced force under strain, enhanced strain recovery, and improved low temperature strain characteristics as compared with non-modified asphalts and asphalt emulsions.

The bituminous binders, even of the PMA type, which are presently employed in road applications often do not have the optimum characteristics at low enough polymer concentrations to consistently meet the increasing structural and workability requirements imposed on roadway structures and their construction. In order to achieve a given level of modified asphalt performance, various polymers are added at some prescribed concentration.

Current practice is to add the desired level of a single polymer, sometimes along with a reactant that promotes crosslinking of the polymer molecules until the desired asphalt properties are met. This reactant typically is sulfur in a form suitable for reacting.

However, the cost of the polymer adds significantly to the overall cost of the resulting asphalt/polymer mix. Thus, cost factors weigh in the ability to meet the above criteria for various asphalt mixes. In addition, at increasing levels of polymer concentration, the working viscosity of the asphalt mix becomes excessively great and separation of the asphalt and polymer may occur.

It is common in the preparation of polymer-modified asphalts to include activators and accelerators to make the crosslinking reaction proceed faster. Zinc oxide (ZnO) is a conventional activator, and mercaptobenzothiazole (MBT) is a conventional accelerator. ZnO is also sometimes used to control the tendency of the polymer to gel. The zinc salt of mercaptobenzothiazole (ZMBT) combines features of both of these conventional additives.

In preparing the composition, significant mixing is needed to insure the uniform addition of both the polymer and any crosslinking agents, accelerators or activators. The crosslinking agents and other agents are usually added as a dry powder and mixed with the asphalt compositions.

The needed elements for the commercial success of any such process include keeping the process as simple as possible, reducing the cost of the ingredients, and utilizing available asphalt cuts from a refinery without having to blend in more valuable fractions. In addition, the resulting asphalt composition must meet the above-mentioned governmental physical properties and environmental concerns. Thus, it is a goal of the industry to maintain or reduce the cost of the polymers and crosslinking agents added to the asphalt without sacrificing any of the other elements and improving the properties of the asphalt and polymer compositions as much as possible. In view of the above, bitumen compositions, which simultaneously meet the performance criteria required for road paving, and which use an alternative crosslinkers to provide PMAs with improved properties would be advantageous.

SUMMARY OF THE INVENTION

There is provided, in one form, a method for preparing asphalt and polymer compositions that involves heating a mixture of asphalt, an elastomeric polymer and crosslinker. The crosslinker includes at least one crosslinker that is mixed polythiomorpholines or at least one alkyl polysulfide. When at least one alkyl polysulfide is used, optionally mercaptobenzimidazole (MBI) may also be used. The mixture is then cured to give a polymer modified asphalt (PMA).

In another embodiment, there is provided a polymer modified asphalt (PMA) composition prepared by the above-noted method.

In a different non-restrictive embodiment of the invention, there is provided a road made from the PMA described immediately above and aggregate.

In another non-limiting embodiment, there is described a method of reducing $H_2S$ evolution from a PMA that involves heating a mixture of asphalt, an elastomeric polymer; and at least one alkyl polysulfide crosslinker. The mixture is cured to give the PMA, where the evolution of $H_2S$ from the PMA is reduced compared with an identical mixture in the absence of the alkyl polysulfide, but using an equivalent amount of sulfur. MBI may also be optionally used.

There is additionally provided in another non-restrictive form a method of recycling asphalt that involves physically removing asphalt from a location and in any order reducing the size of the removed asphalt, heating the removed asphalt, and adding a crosslinker to the mixture. Suitable crosslinkers include mixed polythiomorpholines and at least one alkyl polysulfide, where again MBI may be optionally used along with the alkyl polysulfide.

DETAILED DESCRIPTION OF THE INVENTION

It has been discovered that improvements in rubber/asphalt compatibility may be obtained by crosslinking with certain new crosslinkers. When particular crosslinkers are used to crosslink mixtures of asphalt and elastomeric polymers improved low temperature properties may be obtained (BBR m-value) as compared with identical PMA when mixed polythiomorpholines (MPTM) are used as at least partial or complete replacements for sulfur and/or mercaptobenzothiazole (MBT). When alkyl polysulfides are used, the evolution of hydrogen sulfide ($H_2S$) may be reduced as compared with identical PMA mixtures using sulfur as the crosslinker instead of the alkyl polysulfides. Additionally, improvements after rubber addition may be obtained when at least one alkyl polysulfide and mercaptobenzimidazole (MBI) are used instead of MBT and/or sulfur. This invention may be considered as a potential alternative to the use of resins or other techniques to reduce separation.

As used herein, the term "bitumen" (sometimes referred to as "asphalt") refers to all types of bitumens, including those that occur in nature and those obtained in petroleum processing. The choice of bitumen will depend essentially on the particular application intended for the resulting bitumen composition. Bitumens that may be used may have an initial viscosity at 140° F. (60° C.) of 600 to 3000 poise (60 to 300 Pa-s) depending on the grade of asphalt desired. The initial penetration range (ASTM D5) of the base bitumen at 77° F. (25° C.) is 20 to 320 dmm, and may be 50 to 150 dmm, when the intended use of the copolymer-bitumen composition is road paving. Bitumens that do not contain any copolymer, sulfur, etc., are sometimes referred to herein as a "base bitumen."

"Elastomeric Polymers" are natural or synthetic rubbers and include, but are not necessarily limited to, butyl, polybutadiene, polyisoprene or polyisobutene rubber, ethylene/vinyl acetate copolymer, polyacrylate, polymethacrylate, polychloroprene, polynorbornene, ethylene/propylene/diene (EPDM) terpolymer and advantageously a random or block copolymer of a vinyl aromatic compound, e.g. styrene, and conjugated dienes. In one non-limiting embodiment of the invention, styrene/conjugated diene block copolymers may be used that are linear, radial, or multi-branched. Styrene/butadiene and styrene/isoprene copolymers having an average molecular weight of between 30,000 and 300,000 have been found to be particularly useful in the present invention.

"Conjugated dienes" refer to alkene compounds having 2 or more sites of unsaturation wherein a second site of unsaturation is conjugated to a first site of unsaturation, i.e., the first carbon atom of the second site of unsaturation is gamma (at carbon atom 3) relative to the first carbon atom of the first site of unsaturation. Conjugated dienes include, by way of non-limiting example, butadiene, isoprene, 1,3-pentadiene, and the like.

"Block copolymers of styrene and conjugated-dienes" refer to copolymers of styrene and conjugated-dienes having a linear or radial, tri-block structure consisting of styrene-conjugated diene-styrene block units that are copolymers are represented by the formula:

$S_x\text{-}D_y\text{-}S_z$ where D is a conjugated-diene, S is styrene, and x, y and z are integers such that the number average molecular weight of the copolymer is from about 30,000 to about 300,000. These copolymers are well known to those skilled in the art and are either commercially available or may be prepared from methods known in the art. Such tri-block copolymers may be derived from styrene and a conjugated-diene, wherein the conjugated-diene is butadiene or isoprene. Such copolymers may contain 15 to 50 percent by weight copolymer units derived from styrene, alternatively may contain 20 to 35 percent derived from styrene, and then again may contain 28 to 31 percent derived from styrene, the remainder being derived from the conjugated diene. These copolymers may have a number average molecular weight range between about 50,000 and about 200,000, and alternatively have a number average molecular weight range between about 80,000 and about 180,000. The copolymer may employ a minimal amount of hydrocarbon solvent in order to facilitate handling. Examples of suitable solvents include plasticizer solvent that is a non-volatile aromatic oil. However, when the hydrocarbon solvent is a volatile solvent (as defined above), care should be taken to ensure that the amount of solvent contained in the final bitumen composition is less than about 3.5 weight percent.

In one non-limiting embodiment of the invention, the elastomeric poly-mer is present in a proportion of from about 1 to about 20 wt % of the asphalt/-polymer mixture. In another, non-restrictive form of the invention, the polymer is present in an amount of from about 1 to about 6 wt % of the mixture.

The term "sulfur" is defined herein as elemental sulfur in any of its physical forms, whereas the term "sulfur-containing derivative" includes any sulfur-donating compound, but not elemental sulfur. Sulfur-donating compounds are well known in the art and include various organic compositions or compounds that generate sulfur under the mixing or preparation conditions of the present invention. In one non-limiting embodiment, the elemental sulfur is in powder form known as flowers of sulfur. Other sulfur-containing derivatives or species that may be used in the invention include, but are not necessarily limited to mercaptobenzothiazole, thiurams, dithiocarbamates, sulfur-containing oxazoles, thiazole derivatives, and the like, and combinations thereof. "Thiazole derivatives" include, but are not necessarily limited to, compounds having the necessary functional group to serve as sulfur donors, such as —N=C(R)—S—, including imidazoles and oxazoles. In another non-limiting embodiment of the invention, the sulfur and/or other crosslinker is present in an amount ranging from about 0.01 to about 1 wt %, alternatively when about 0.75 wt % is the upper limit, alternatively from about 0.06% to about 0.3 wt. % based on the asphalt, and in another non-limiting embodiment is present in an amount from about 0.08 to about 0.2 wt. %. As noted earlier, the zinc salt of mercaptobenzothiazole (ZMBT) combines features of conventional additives. Other metal salts of MBT may also be useful.

Acceptable crosslinkers, in one non-limiting embodiment of the invention, are thiuram polysulfides. In another non-limiting embodiment of the invention, the thiuram polysulfides have the formula:

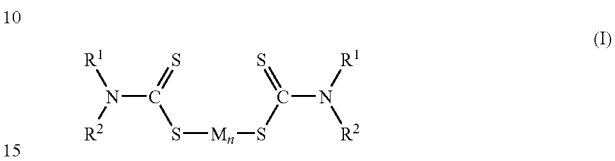

where $R^1$ and $R^2$ are the same or different alkyl substituents having from 1 to 4 carbon atoms, and wherein M is a metal selected from zinc, barium or copper, and n is 0 or 1. In another non-limiting embodiment of the invention, a crosslinking temperature range for thiuram polysulfides of formula (I) is above 180° C. (356° F.), alternatively, the crosslinking temperature range may be between about 130 and about 205° C. (280-400° F.). Thiuram polysulfides within the context of this invention include, but are not limited to, zinc dialkyldithiocarbamates such as dimethyldithiocarbamate.

In still another non-limiting embodiment of the invention, the sulfur-containing derivative excludes added elemental sulfur, per se. Alternatively, the asphalt and elastomeric polymer mixture may contain added elemental sulfur, but the crosslinking is conducted at a temperature different from the optimum cross-linking temperature for elemental sulfur, per se.

As noted, the inventive crosslinkers herein include polythiomorpholines and one or more alkyl polysulfide, and in one non-limiting embodiment mixtures of one or more alkyl polysulfide with mercaptobenzimidazole (MBI). It has been surprisingly discovered that these new crosslinkers may replace partially or entirely the conventional crosslinkers described above, such as sulfur and/or MBT, to give improved properties. The proportional amounts of these new crosslinkers are identical to the conventional crosslinkers, and in another non-restrictive embodiment have equivalent sulfur proportions, that is, the same sulfur contents as those of the conventional crosslinkers previously discussed.

In one non-limiting embodiment the mixed polythiomorpholines include polythiomorpholine having the structure:

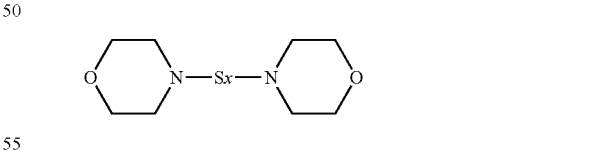

where x is greater than 2. By "mixed" is meant at least two different polythiomorpholines.

In another non-restrictive embodiment, the alkyl polysulfide has the structure

$R1_3\text{—}S\text{—}S\text{—}R2_3$ where R1 and R2 are independently straight, branched or cyclic alkyl groups or aromatic groups, where R1 and R2 may be substituted with N, S and/or O, and the total number of carbon atoms in all R1 groups is 9 or greater and the total number of carbon atoms in all R2 groups is 9 or greater.

The term "desired Rheological Properties" refers primarily to the SUPERPAVE asphalt binder specification designated by AASHTO as MP1 as will be described below. Additional asphalt specifications may include viscosity at 140° F. (60° C.) of from 1600 to 4000 poise (160-400 Pa-s) before aging; a toughness of at least 110 inch-pound (127 cm-kilograms) before aging; a tenacity of at least 75 inch-pound (86.6 cm-kilograms) before aging; and a ductility of at least 25 cm at 39.2° F. (4° C.) at 5 cm/min. pull rate after aging.

Viscosity measurements are made by using ASTM test method D2171. Ductility measurements are made by using ASTM test method D113. Toughness and tenacity measurements are made by a Benson Method of Toughness and Tenacity, run at 20 inches/minute (50.8 cm/minute) pull rate with a ⅛ inch (2.22 cm) diameter ball.

By "storage stable viscosity" it is meant that the bitumen composition shows no evidence of skinning, settlement, gelation, or graininess and that the viscosity of the composition does not increase by a factor of four or more during storage at 325±0.5° F. (163±2.8° C.) for seven days. In one non-limiting embodiment of the invention, the viscosity does not increase by a factor of two or more during storage at 325° F. (163° C.) for seven days. In another non-limiting embodiment of the invention, the viscosity increases less than 50% during seven days of storage at 325° F. (163° C.). A substantial increase in the viscosity of the bitumen composition during storage is not desirable due to the resulting difficulties in handling the composition and in meeting product specifications at the time of sale and use.

The term "aggregate" refers to rock and similar material added to the bitumen composition to provide an aggregate composition suitable for paving roads. Typically, the aggregate employed is rock indigenous to the area where the bitumen composition is produced. Suitable aggregate includes granite, basalt, limestone, and the like.

As used herein, the term "asphalt cement" refers to any of a variety of substantially solid or semi-solid materials at room temperature that gradually liquify when heated. Its predominant constituents are bitumens, which may be naturally occurring or obtained as the residue of refining processing. As mentioned, the asphalt cements are generally characterized by a penetration (PEN, measured in tenths of a millimeter, dmm) of less than 400 at 25° C., and a typical penetration range between 40 and 300 (ASTM Standard, Method D-5). The viscosity of asphalt cement at 60° C. is more than about 65 poise. Asphalt cements are alternately defined in terms specified by the American Association of State Highway Transportation Officials (AASHTO) AR viscosity system.

The asphalt terms used herein are well known to those skilled in the art. For an explanation of these terms, reference is made to the booklet SUPER-PAVE Series No. 1 (SP-1), 1997 printing, published by the Asphalt Institute (Research Park Drive, P.O. Box 14052, Lexington, Ky. 40512-4052), which is hereinafter referred to as MP1 (Standard Specification for Performance Graded Asphalt Binder). For example, Chapter 2 provides an explanation of the test equipment, terms, and purposes. Rolling Thin Film Oven (RTFO) and Pressure Aging Vessel (PAV) are used to simulate binder aging (hardening) characteristics. Dynamic Shear Rheometers (DSR) are used to measure binder properties at high and intermediate temperatures. These are used to predict permanent deformation or rutting and fatigue cracking. Bending Beam Rheometers (BBRs) are used to measure binder properties at low temperatures. These values predict thermal or low temperature cracking. The procedures for these experiments are also described in the above-referenced SUPER-PAVE booklet.

Asphalt grading is given in accordance with accepted standards in the industry as discussed in the above-referenced Asphalt Institute booklet. For example, pages 62-65 of the booklet include a table entitled Performance Graded Asphalt Binder Specifications. The asphalt compositions are given performance grades, for example, PG 64-22. The first number, 64, represents the average 7-day maximum pavement design temperature in ° C. The second number, −22, represents the minimum pavement design temperature in ° C. Other requirements of each grade are shown in the table. For example, the maximum value for the PAV-DSR test (° C.) for PG 64-22 is 25° C.

One of the methods commonly utilized in the industry to standardize the measure or degree of compatibility of the rubber with the asphalt is referred to as the compatibility test. Compatibility tests provide a measure of the degree of separability of materials comprising the asphalt. The long-term compatibility between rubber and the other components of PMA, for example, is an important consideration when preparing road material. If rubber is not compatible with the other components of PMA, then the performance of road materials containing PMA is degraded. Compatibility is assessed by measuring the softening point of asphalt after a period of thermally-induced aging (for example Louisiana DOTD Asphalt Separation of Polymer Test Method TR 326). The test is performed on a polymer-modified asphalt mixture comprised of rubber and asphalt with all the applicable additives, such as the crosslinking agents. The mixture is placed in tubes, usually made of aluminum or similar material, referred to as cigar tubes or toothpaste tubes. These tubes are about one inch (2.54 cm) in diameter and about fifteen centimeters deep. The mixture is placed in an oven heated to a temperature of about 162° C. (320° F.). This temperature is representative of the most commonly used asphalt storage temperature. After the required period of time, most commonly twenty-four (24) hours, the tubes are transferred from the oven to a freezer and cooled down to solidify. The tubes are kept in the vertical position. After cooling down, the tubes are cut into thirds; three equal sections. The Ring and Ball softening point of the top one third is compared to the softening point of the bottom section. This test gives an indication of the separation or compatibility of the rubber within the asphalt. The rubber would have the tendency to separate to the top. The lower the difference in softening point between the top and bottom sections, the more compatible are the rubber and asphalt. In today's environment, many states require a difference of 4° F. (2° C.) or less to consider the asphalt/rubber composition as compatible. Few standards allow a higher difference. The twenty-four hour test is used as a common comparison point. In one non-limiting embodiment of the invention, this compatibility test value is 20° C. or less.

In accordance with one non-limiting embodiment of the present invention, an asphalt composition is prepared by adding the asphalt or bitumen to a mixing tank that has stirring means. The asphalt is added and stirred at elevated temperatures. Stirring temperatures depend on the viscosity of the asphalt and may range up to 500° F. (260° C.) and alternatively up to about 450° F. (232° C.). In one non-restrictive embodiment, the lower heating limit is about 300° F. (149° C.), and alternatively about 325° F. (163° C.). Asphalt products from refinery operations are well known in the art. For example, asphalts typically used for this process are obtained from deep vacuum distillation of crude oil to obtain a bottom product of the desired viscosity or from a solvent deasphalting process that yields a demetallized oil, a resin fraction and an asphaltene fraction. Some refinery units do not have a resin fraction. These materials or other compatible oils of greater than 450° F. (232° C.) flash point may be blended to obtain the desired viscosity asphalt.

Rubbers, elastomeric polymers, or thermoplastic elastomers suitable for this application are well known in the art as described above. For example, FINAPRENE® SBS rubber products available from Atofina Elastomers Inc. are suitable for the applications of the present invention. This example is not limiting for the inventive technology that may be applied to any similar elastomeric product particularly those produced from styrene and butadiene.

In one non-limiting embodiment of the invention, a metal oxide activator is also present in the asphalt/polymer mixture of the invention. As mentioned, zinc oxide is a known, conventional activator, and may also be used to suppress the evolution of hydrogen sulfide. Other useful metal oxides include, but are not necessarily limited to, CaO, MgO and CuO as discussed in U.S. Patent Application 2004/0030008 A1, incorporated by reference herein. In one non-restrictive form of the invention, the acid is present in an equimolar amount of the ZnO present.

Various other additives suitable for the purposes of this invention include, but are not necessarily limited to, known and future accelerators, activators, divalent metal oxides (e.g. zinc oxide) and the like. A variety of accelerators may be used in conjunction with this invention, including, but not limited to, dithiocarbamates and benzothiazoles. Many crosslinking agents and other additives are normally sold in powder or flake form.

The methods and compositions of this invention will be further illustrated with respect to particular Examples that are only intended to more fully illuminate the invention and not limit it.

EXAMPLES 1-6

Without wanting to be limited to any particular explanation or mechanism, it has been unexpectedly discovered that mixed polythiomorpholines (MPTM) may serve as crosslinkers, crosslinking accelerators and/or as sulfur donors for bridge formation. Formulations were trialed in which the MBT accelerator, elemental sulfur, or a combination of the MBT/S were replaced by MPTM for crosslinking activity and resultant PMA SHRP properties.

The asphalt sample was heated to 350° F. (177° C.) with low shear mixing. The mixing was changed to high shear and the polymer added. Mixing continued on high shear for 1 hour at 350° F. (177° C.). The mixing was reduced to low shear. The crosslinking agents were added and mixing continued on low shear at 350° F. (177° C.) for 1 hour. The PMA mixture was aged in the oven at 325° F. (163° C.) for 24 hours. The cured asphalt was tested for 24/48-hour Compatibility, MP1 graded, and the 135° C. Rotational Viscosity measured. Observations were noted (e.g. gelling, film formation, lumps, smoke, etc.).

The formulation are presented in Table I and the MP1 testing, viscosity, and rubber compatibility results for the formulations with the indicated amounts of MPTM are presented in Table II.

TABLE I

Formulations of Examples 1-6

| Example | Formulation |
|---|---|
| 1 | 100% of a PG67-22 asphalt |
| 2 | 4.0% FINAPRENE ® 502 thermoplastic elastomer type linear styrene-butadiene block copolymer (SBS) in 96.0% of the PG67-22 asphalt of Example 1, crosslinked with 0.075 ZnO/0.075 MBT/0.15 S |
| 3 | 4.0% FINAPRENE 502 copolymer (FP502) in 96.0% PG67-22 asphalt of Ex. 1, crosslinked with 0.075 ZnO/0.075 MBT/0.15 MPTM |
| 4 | 4.0% FP502 in 96.0% PG67-22 asphalt of Ex. 1, crosslinked with 0.075 ZnO/0.075 MPTM/0.15 S |
| 5 | 4.0% FP502 in 96.0% PG67-22 asphalt of Ex. 1, crosslinked with 0.075 ZnO/0.0375 MBT/0.075 S/0.1125 MPTM |
| 6 | 4.0% FP502 in 96.0% PG67-22 asphalt of Ex. 1, crosslinked with 0.075 ZnO/0.225 MPTM |

TABLE II

MPTM Crosslink Formulation Blends

|  | Units | Ex. 1 | Ex. 2 | Ex. 3 | Ex. 4 | Ex. 5 | Ex. 6 |
|---|---|---|---|---|---|---|---|
| PG67-22 asphalt | Wt % | 100 | 96.0 | 96.0 | 96.0 | 96.0 | 96.0 |
| FP502 copolymer | Wt % |  | 4.0 | 4.0 | 4.0 | 4.0 | 4.0 |
| ZnO | Wt % |  | 0.075 | 0.075 | 0.075 | 0.075 | 0.075 |
| MBT | Wt % |  | 0.075 | 0.075 |  | 0.0375 |  |
| Sulfur | Wt % |  | 0.15 |  | 0.15 | 0.075 |  |
| MPTM | Wt % |  |  | 0.15 | 0.075 | 0.1125 | 0.225 |
| Binder DSR | ° C. | 68.4 | 85.0 | 80.5 | 86.1 | 83.0 | 82.8 |
| RTFO DSR | ° C. | 69.4 | 79.5 | 79.8 | 80.6 | 81.0 | 81.1 |
| PAV DSR | ° C. | 26.4 | 21.9 | 21.2 | 23.8 | 22.8 | 22.3 |
| m-Value | ° C. | −12.5 | −14.6 | −13.0 | −14.5 | −14.6 | −13.2 |
| S-Value | ° C. | −13.6 | −16.3 | −18.8 | −16.1 | −16.1 | −15.7 |
| 135° C. Viscosity | Pa sec |  | 2.13 | 1.80 | 2.17 | 1.86 | 1.73 |
| 48-hour Compatibility | ° F. |  | 0.0 | 0.0 | 0.7 | 4.2 | 2.5 |
|  | (° C.) |  | (0.0) | (0.0) | (0.4) | (2.3) | (1.4) |

Replacement of sulfur with an equivalent wt % of MPTM resulted in PMA with similar MP1 properties with the exception of the ODSR Fail Temperature and the separation between the ODSR/RTFO DSR Fail Temperatures (see Ex. 3, Table II). There is an accompanying decrease in the 135° C. Rotational Viscosity with MPTM-for-sulfur blend, perhaps indicating fewer sulfur bridges (crosslinks) in the PMA blend of Example 3. The relative extra crosslinks in the Control Blend (Ex. 2) that may impart a higher viscosity, as measured by Rotational Viscosity and ODSR Fail Temperature, are apparently not stable under the moderate oxidation of RTFO accelerated aging. Not limiting examples would be interpolymer (chain) poly-sulfur bridges that could be broken (and lost) or rearranged to intra-polymer bridges under mild oxidation of RTFO aging ("Reversion"). Under this hypothesis, the bridging of the RTFO-aged sample would represent the oxidation and heat stable crosslinks, while the ODSR Fail Temperature would be considered a relative measure of all (initial) crosslinks.

The blend in which the MBT is replaced by MPTM (blend of Example 5, Table II) has properties very similar to the Control Blend of Ex. 2, with a repeat of the relatively larger ODSR/RTFO DSR separation. Replacement of 50% each of the MBT and sulfur (as in the blend of Ex. 4, Table II) decreases the rubber compatibility to just outside of the specification maximum of 4° F. (2.2° C.). However, the ODSR/RTFO DSR Temperature separation is narrowed, showing improvement.

Finally, in the blend of Example 6, both the MBT and sulfur were replaced by an equivalent (total) weight of MPTM. The blend was rubber compatible and had a narrow ODSR/RTFO DSR Temperature separation. As with blends of Examples 3 and 5, in which some or all of the sulfur was replaced by MPTM, the ODSR/RTFO DSR Temperature separation was narrowed, and the 135° C. Rotational Viscosity was decreased, relative to the Control Blend of Example 2.

From the above Examples, it may be seen that MPTM may be substituted for MBT in equivalent wt % to produce rubber compatible PMA. Replacement of sulfur with equivalent MPTM results in PMA with limiting MP1 properties very similar to the Control PMA (Ex. 2), crosslinked with traditional ZnO/MBT/S. However, the Rotational Viscosity and ODSR are significantly lower in the MPTM-for-sulfur blend.

In all three blends in which the sulfur is at least partially replaced (PMA Examples 3, 5 and 6), the Rotational Viscosity was significantly lower than the Control Blend (Ex. 2), and the ODSR Temperature was reduced along with the ODSR/RTFO DSR Temperature separation. In all three blends in which the MBT was at least partially replaced (Examples 4, 5 and 6), the separation was improved, relative to the Control Blend (Ex. 2) crosslinked with ZnO/MBT/S. This is an indication, at least in this asphalt, that MPTM is a more effective crosslink accelerator.

EXAMPLES 7-10

Mixed polythiomorpholines (MPTM) are shown in these Examples to be an effective replacement for MBT, and MBT/S in crosslinking. These Examples tested MPTM as a replacement for MBT and MBT/S in a PG64-22 base stock.

PMAs were crosslinked with traditional ZnO/MBT/S, MPTM substituted for MBT, and MPTM substituted for MBT/S. Each PMA was SHRP graded and the Compatibility and 135° C. Viscosity measured. Formulations tested included those in Table III:

TABLE III

Formulations of Examples 7-10

| Example | Formulation |
| --- | --- |
| 7 | 100% of a PG64-22 asphalt, MP1 graded |
| 8 | 95.5 wt % PG64-22 of Ex. 7, 4.5 wt % FP502, crosslinked with 0.06 ZnO/0.06 MBT/0.12 S |

TABLE III-continued

Formulations of Examples 7-10

| Example | Formulation |
| --- | --- |
| 9 | 95.5 wt % PG64-22 of Ex. 7, 4.5 wt % FP502, crosslinked with 0.06 ZnO/0.06 MPTM/0.12 S |
| 10 | 95.5 wt % PG64-22 of Ex. 7, 4.5 wt % FP502, crosslinked with 0.06 ZnO/0.18 MPTM |

The test procedure for Examples 7-10 involved heating the asphalt sample to 350° F. (177° C.) with low shear mixing. The mixing was changed to high shear and the polymer added. Mixing continued on high shear for 1 hour at 350° F. (177° C.). The mixing was reduced to low shear. The crosslinking agents were added and mixing continued on low shear at 350° F. (177° C.) for 1 hour. The PMA mixture was aged in the oven at 325° F. (163° C.) for 24 hours. The cured asphalt was tested for 48-hour Compatibility, MP1 graded, and the 135° C. Rotational Viscosity measured. Observations were noted (e.g. gelling, film formation, lumps, smoke, etc.). The MP1 grading results of the base asphalt and each of the PMA formulations are presented in Table IV.

TABLE IV

MP1 Properties of PMA Crosslinked with ZnO/MBT/S, ZnO/MPTM/S, and ZnO/MPTM

| | Units | Ex. 7 | Ex. 8 | Ex. 9 | Ex. 10 |
| --- | --- | --- | --- | --- | --- |
| PG64-22 asphalt | Wt % | 100 | 95.5 | 95.5 | 95.5 |
| FP502 | Wt % | | 4.5 | 4.5 | 4.5 |
| ZnO | Wt % | | 0.06 | 0.06 | |
| MBT | Wt % | | 0.06 | | |
| Sulfur | Wt % | | 0.12 | 0.12 | |
| MPTM | Wt % | | | 0.06 | 0.18 |
| Binder DSR | ° C. | 65.4 | 87.3 | 85.3 | 81.1 |
| RTFO DSR | ° C. | 66.4 | 79.0 | 79.1 | 79.0 |
| PAV DSR | ° C. | 20.5 | 20.8 | 15.3 | 20.1 |
| m-Value | ° C. | −15.4 | −17.3 | −16.6 | −13.8 |
| S-Value | ° C. | −15.4 | −18.2 | −18.2 | −17.6 |
| 48-hr Compatibility | ° F. (° C.) | | 2.5 (1.4) | 2.6 (1.4) | 1.9 (1.1) |
| 135° C. Viscosity | Pa * s | | 1.74 | 1.83 | 1.52 |

All of the PMA blends were rubber compatible and were MP1 graded. The Control Blend (Blend of Example 8, Table IV) had a large 8° C.+ separation between the ODSR (Binder DSR) Fail Temperature and the limiting RTFO DSR Fail Temperature. The blend in which the MBT was replaced by MPTM (Blend of Ex. 9, Table IV), had an ODSR reduced by 2° C. compared to the Control Blend. There was significant improvement (lowering) in the PAV DSR Fail Temperature of the MPTM-for-MBT blend (Ex. 9) compared with the Control Blend (Ex. 8), although the PAV DSR is not limiting in PMA from PG67/64-22 base(s). The blend in which all of the MBT/S was replaced with MPTM (Ex. 10) had an ODSR lowered by 6° C.+ compared to the Control, but there was no change in the limiting RTFO Fail Temperature. There was a significant loss (increase) of 3.5° C. in the limiting m-Value Fail Temperature vs. the Control PMA formulation. The significant reduction in the ODSR Fail Temperatures of the MPTM for MBT/S blend (Ex. 10) may be from a reduction in crosslink density, as evidenced by a reduction in the 135° C. Viscosity.

MPTM appears to be suitable as a direct replacement for MBT in PMA crosslinking. Silica-coated MPTM is generally less expensive than MBT and thus may be a useful substitute.

EXAMPLES 11-18

TPS-32 ditertiododecyl polysulfide, available from Atofina, is a liquid polysulfide discovered to be a substitute for elemental sulfur in PMA formulations. PMA formulated with TPS-32 at equivalent additive sulfur rates was rubber compatible and met target PG76-22 MP1 specifications. The PMA formulated with TPS-32 had properties equivalent to PMA formulated from the same base stock but crosslinked with the traditional ZnO/MBT/S combination. There was a reduction in measured $H_2S$ when compared to traditionally crosslinked PMA.

Experimental Procedure

A one-half size batch of PG76-22 graded PMA was formulated. The FINAPRENE 502 rubber concentration was 3.2 wt %, and the crosslinking agents added at 0.075 wt % ZnO, 0.075 wt % MBT, and 0.48 TPS-32 (0.15 wt % active sulfur).

The Plant Trial Asphalt Production Procedure was as follows:
1) Empty and isolate a PMA production tank for the trial PMA formulation.
2) Prepare PMA batch, sized for 2000 bbls PG67-22 base stock, 33,250 lbs FINAPRENE 502.
3) Crosslink with 2200 lbs of modified ZnO/MBT crosslinker (550 lbs ZnO and 550 lbs of MBT in 1100 lbs of SunPave 125T carrier oil available from Sunoco Inc.) and 2750 lbs of TPS-32 (40% active sulfur). Transfer from drums into vacuum truck and injection into PMA production tank.
4) Pull a 2-gallon sample of the crosslinked PMA immediately before crosslinker addition. Test can sample using ATX $H_2S$ Tester and Draeger Tube for $H_2S$ levels; send sample for testing. (Example 12 material)
5) Pull a 2-gallon sample of the crosslinked PMA 5 minutes following crosslinker injection. Test can sample using ATX $H_2S$ Tester and Draeger Tube for $H_2S$ levels; send sample for testing. (Example 13 material)
6) Pull a 2-gallon sample of the crosslinked PMA 1 hour after crosslinker addition. Test can sample using ATX $H_2S$ Tester and Draeger Tube for $H_2S$ levels; send sample for testing. (Example 14 material)
7) Pull a 2-gallon sample of the crosslinked PMA 2 hours after crosslinker addition. Test can sample using ATX $H_2S$ Tester and Draeger Tube for $H_2S$ levels; send sample for testing. (Example 15 material)
8) Pull a 2-gallon sample of the crosslinked PMA 6 hours after crosslinker addition. Test can sample using ATX $H_2S$ Tester and Draeger Tube for $H_2S$ levels; send sample for testing. (Example 16 material)
9) Pull a 2-gallon sample of the crosslinked PMA 12 hours after crosslinker addition. Test can sample using ATX $H_2S$ Tester and Draeger Tube for $H_2S$ levels; send sample for testing. (Example 17 material)
10) Pull a 2-gallon sample of the crosslinked PMA 24 hours after crosslinker addition. Test can sample using ATX $H_2S$ Tester and Draeger Tube for $H_2S$ levels; send sample for testing. (Example 18 material)

Testing involved MP1 grading each of the PMA samples from the trial, measuring the 135° C. viscosity, testing for 48-hour compatibility, and noting observations. Each of the timed samples was also tested for $H_2S$. The MP1 grading of the asphalt/PMA samples is presented in Table V.

TABLE V

Time-lapsed MP1 Data from TPS-32 Crosslinked PG76-22 PMA Trial

|  | Units | Ex. 11 | Ex. 12 | Ex. 13 | Ex. 14 | Ex. 15 | Ex. 16 | Ex. 17 | Ex. 18 |
|---|---|---|---|---|---|---|---|---|---|
| PG67-22 Base Asphalt | Wt % | 100 | | | | | | | |
| Before XL Addition + Rubber | Wt % | | 100 | | | | | | |
| 5 mins Post XL Addition | Wt % | | | 100 | | | | | |
| 1 hr Post XL Addition | Wt % | | | | 100 | | | | |
| 2 hrs Post XL Addition | Wt % | | | | | 100 | | | |
| 6 hrs Post XL Addition | Wt % | | | | | | 100 | | |
| 12 hrs Post XL Addition | Wt % | | | | | | | 100 | |
| 24 hrs Post XL Addition | Wt % | | | | | | | | 100 |
| Binder DSR | ° C. | 68.2 | | 77.9 | 80.8 | 82.2 | 83.6 | 84.7 | 84.2 |
| RTFO DSR | ° C. | 69.8 | | 80.0 | 80.1 | 80.8 | 81.1 | 80.1 | 80.6 |
| PAV DSR | ° C. | 24.9 | | −0.6 | 13.6 | 13.8 | 14.4 | 12.4 | 14.6 |
| m-Value | ° C. | −15.0 | | −16.4 | −16.1 | −15.8 | −17.1 | −17.4 | −17.4 |
| S-Value | ° C. | −18.5 | | −22.2 | −21.3 | −20.9 | −21.2 | −22.4 | −21.4 |
| 48 hr Compatibility | ° F. | | 69.2 | 2.2 | 0.9 | 1.5 | 5.4 | 0.7 | 0.6 |
|  | (° C.) | | (38.4) | (1.2) | (0.5) | (0.8) | (9.7) | (0.4) | (0.3) |
| 135° C. Viscosity | Pa * s | 0.55 | 1.34 | 1.75 | 1.97 | 2.03 | 1.96 | 2.04 | 1.98 |

The neat base stock (Ex. 11) met the expected PG67-22 specifications and the test values were consistent with reported values. The rubberized asphalt (blend from Ex. 12, Table V) was not compatible with a measured separation of 62.9° F. (34.9° C.) and was not further tested. The sample collected 5 minutes (blend from Ex. 13, Table V) after crosslinker addition was compatible. However, the 135° C. Viscosity had not maximized, compared to the final ODSR Fail Temperature, indicating that the crosslinking reaction was not complete. In addition, the Original Binder DSR was still lower than the RTFO DSR, unlike the finished PMA, another indication that the crosslinking action was not completed. The PAV DSR Fail Temperature of the same blend was unexplainably low at 0.6° C. At 1 hr after crosslinker addition (blend from Ex. 4, Table V), the PMA properties were close to the final values seen after the complete 24 hrs of heat aging, although the Original Binder DSR Fail Temperature had still not stabilized. Final PMA properties were stabilized after at least 6 hrs of heat aging (blend from Ex. 5, Table V). Although the compatibility of 5.4 for the Example 6 material is out-of-specification limits, the separation test value is assumed to be an anomaly, as all other post crosslinker addition compatibility tests were within specification limits. The MP1 properties (DSR and BBR Fail Temperatures) and the 135° C. Viscosity did not change significantly after 6 hrs of heat aging. After 24 hrs of heat aging the PMA was moved to finished inventory, graded, and shipped with normal production.

For comparison, the MP1 grades from two randomly selected PG76-22 PMA batches made from the same base stock are presented in Table VI. It may be seen that the limiting RTFO DSR Fail Temperatures are statistically equivalent; specifically, the limiting RTFO DSR Fail Temperature is within the 1° C. margin of error in the test. There is an increase in the ODSR Fail Temperature of the TPS-32 crosslinked PMA. There is also significant improvement (lowering) in the PAV DSR Fail Temperature in the PMA crosslinked with the TPS-32. The low-temperature MP1 values are essentially the same.

TABLE VI

SHRP Grading of Trial PMA and PG76-22 PMA Batches

|  | Units | EX. 19 TPS-32 Final | Ex. 20 PG76-22 | Ex. 21 PG76-22 |
|---|---|---|---|---|
| Binder DSR | ° C. | 84.2 | 81.1 | 80.5 |
| RTFO DSR | ° C. | 80.6 | 80.4 | 79.6 |
| PAV DSR | ° C. | 14.6 | 18.1 | 18.8 |
| m-Value | ° C. | −17.4 | −15.8 | −18.8 |
| S-Value | ° C. | −21.4 | −21.4 | −24.2 |
| 48 hr Compatibility | ° F. | 0.6 | 0.8 | 0.3 |
|  | (° C.) | (0.3) | (0.4) | (0.2) |
| 135° C. Viscosity | Pa * s | 1.98 | 2.06 | 1.89 |

All PG64/67-22 and PMA base stocks are currently treated with 0.1 wt % ZnO for $H_2S$ abatement. Currently any PMA base stock is treated with an additional 0.1wt % of ZnO immediately prior to crosslinker addition to eliminate/reduce $H_2S$ emissions in the final PMA resulting from the sulfur-containing crosslinker. The second treatment of 0.1 wt % ZnO was not added prior to TPS-32 XL addition, so that the effects of the sulfur donor change on $H_2S$ emissions could be determined.

$H_2S$ measurements were taken during the trial by ATX Automatic Tester and Draeger Tube Sampler on the air space of (asphalt) can samples taken from the mix tank during the trial. There was no measurable $H_2S$ in the Base Asphalt or asphalt/rubber blend by either the ATX or Draeger Tube Sampler. After cross-linker addition, the ATX registered 400-450 ppm $H_2S$ consistently over the entire 24 hr cure time; $H_2S$ measured by the Draeger Tube Sampler was above the 200 ppm detection limit of the test during the age-curing period. The trial samples were tested for $H_2S$ by collection of vapors in a caustic trap and follow-up titration. The results from the testing are presented in Table VII. The 400-450 ppm levels of $H_2S$ measured during the trial by the ATX Tester were considerably lower than the 1000+ ppm readings from earlier testing on PMA following traditional ZnO/MBT/s crosslinker addition. However, at 400-450 ppm, the $H_2S$ levels are above the plant action limit of 10 ppm.

TABLE VII $H_2S$ Measurements from Testing of Trial Material

| Example | — | Units | |
|---|---|---|---|
| 11 | PG67-22 Base Asphalt | ppm | <1 |
| 12 | Before Crosslinker Addition + Rubber | ppm | <1 |
| 13 | 5 mins Post Crosslinker Addition | ppm | 151 |
| 14 | 1 hr Post Crosslinker Addition | ppm | 39 |
| 15 | 2 hrs Post Crosslinker Addition | ppm | 7 |

TABLE VII-continued $H_2S$ Measurements from Testing of Trial Material

| Example | — | Units | |
|---|---|---|---|
| 16 | 6 hrs Post Crosslinker Addition | ppm | 20 |
| 17 | 12 hrs Post Crosslinker Addition | ppm | 7 |
| 18 | 24 hrs Post Crosslinker Addition | ppm | 8 |

The finished TPS-32 crosslinked PMA was treated with the prescribed second dosage of 0.1 wt % ZnO after 24 hr aging for $H_2S$ abatement. After treatment, no $H_2S$ was detected by either the ATX Automatic Tester or the Draeger Tube Analyzer in the final PMA and the material was moved to finished inventory.

TPS-32 was thus found suitable as a replacement crosslinker for elemental sulfur in crosslinked PMA and was rubber compatible and met target PG76-22 specifications. There was an increase in the ODSR Fail Temperature and improvement (lowering) of the PAV DSR Fail Temperature in the TPS-32 crosslinked PMA. There was a reduction in the $H_2S$ emissions immediately after TPS-32 crosslinker addition, compared to previous testing on PMA crosslinked with ZnO/MBT and elemental sulfur. However, the levels of $H_2S$, even in the finished/cured PMA (400+ ppm by ATX) were still beyond the action limits of 10 ppm. The final PMA was treated with 0.1 wt % ZnO and no $H_2S$ was detected in the ZnO-treated finished product. It should be recognized that this method is not optimized.

EXAMPLES 19-32

A wide range of PMA formulations were tested for relationship of rheological data to rubber compatibility. Improvements are obtained when MBT is replaced by MBI. The MBI-crosslinked PMAs were also improved when compared to the Control blend crosslinked with traditional ZnO/MBT/S. Compatibility was improved in blends crosslinked with TPS-32. The test procedure was the same as for Examples 7-10.

Table VIII contains the test results for the FINAPRENE 502-modified blends, crosslinked with ZnO/MBT/S, and blends in which the MBT and/or S is replaced by MBI or TPS-32, respectively.

TABLE VIII

FP502 PMA Blends for Compatibility and Rubber Response

|  | Units | Ex. 19 | Ex. 20 | Ex. 21 | Ex. 22 | Ex. 23 |
|---|---|---|---|---|---|---|
| PG64-22 Base Asphalt | Wt % | 100 | 96 | 96 | 96 | 96 |
| FP502 | Wt % |  | 4 | 4 | 4 | 4 |
| ZnO | Wt % |  | 0.06 | 0.06 | 0.06 | 0.06 |
| MBT | Wt % |  | 0.06 |  | 0.06 |  |
| MBI | Wt % |  |  | 0.06 |  | 0.06 |
| Sulfur | Wt % |  | 0.12 | 0.12 |  |  |
| TPS-32 Polysulfide | Wt % |  |  |  | 0.40* | 0.40* |
| Binder DSR | ° C. | 66.3 | 83.4 | 83.6 | 82.5 | 83.0 |
| RTFO DSR | ° C. | 67.8 | 81.2 | 82.8 | 82.0 | 82.4 |
| PAV DSR | ° C. | 23.0 | 18.8 | N/A | 12.6 | 11.7 |
| m-Value | ° C. | −14.8 | −17.5 | −17.1 | −17.2 | −17.2 |
| S-Value | ° C. | −15.8 | −20.4 | −19.4 | −19.5 | −19.6 |
| 24 hr Compatibility | ° F. (° C.) |  | 4.7 (2.6) | 8.6 (4.8) | 0.8 (0.4) | 2.1 (1.2) |

TABLE VIII-continued

FP502 PMA Blends for Compatibility and Rubber Response

|  | Units | Ex. 19 | Ex. 20 | Ex. 21 | Ex. 22 | Ex. 23 |
|---|---|---|---|---|---|---|
| 135° C. Viscosity | Pa * s |  | 1.88 | 1.88 | 1.63 | 1.71 |

*0.4 wt % TPS-32 has sulfur equivalent to 0.12 wt % elemental sulfur.

The Compatibility of FP502 in this asphalt was tested without crosslinking and found to have a separation of 60.2° F. (33.4° C.) at 24 hrs. The Control PMA (Blend from Ex. 20, Table VIII) is known to be compatible at the test specification of 48 hrs with a separation of 2° F. (1° C.). Substitution of MBI for MBT (Blend from Ex. 21, Table VIII) produced PMA with improved properties. The results from Example 22, with TPS-32 substituted for sulfur showed improved properties, relative to the Control blend crosslinked with ZnO/MBT/S, particularly a dramatic improvement in the 24 hr Compatibility. The blend crosslinked with ZnO/MBI/TPS-32 showed improved 24 hr Compatibility, intermediate of the effects seen with just MBI or TPS-32 substitution into the crosslinker. All of the PMA blends in Table VII had viscosities within the normal range for PG76-22.

The trend of dramatic improvement (decrease) in the PAV DSR Fail Temperature upon crosslinking with MBI and/or TPS-32 has been seen in Examples 11-18. However, PAV DSR Fail Temperature is never a limiting factor in PG76-22 production.

Several FP502 modified blends were formulated and crosslinked with the ZnO substituted by CaO, Calcium Stearate, or Zinc Stearate, and in conjunction with MBI/TPS-32. The test results for these blends are presented in Table IX.

TABLE IX

FP502 PMA blends for Compatibility

|  | Units | Ex. 19 | Ex. 24 | Ex. 25 | Ex. 26 | Ex. 27 |
|---|---|---|---|---|---|---|
| PG64-22 Base Asphalt | Wt % | 100 | 96 | 96 | 96 | 96 |
| FINAPRENE 502 | Wt % |  | 4 | 4 | 4 | 4 |
| CaO | Wt % |  | 0.06 |  |  |  |
| Calcium Stearate | Wt % |  |  | 0.12 | 0.12 |  |
| Zinc Stearate | Wt % |  |  |  |  | 0.06 |
| MBT | Wt % |  |  |  |  |  |
| MBI | Wt % |  | 0.06 | 0.06 | 0.06 | 0.06 |
| Sulfur | Wt % |  |  | 0.12 |  |  |
| TPS-32 Polysulfide | Wt % |  | 0.40 |  | 0.40 | 0.40 |
| Binder DSR | ° C. | 66.3 | 81.8 | 83.5 | 82.7 | 82.3 |
| RTFO DSR | ° C. | 67.8 | 81.8 | 80.9 | 81.2 | 82.6 |
| PAV DSR | ° C. | 23.0 | 12.9 | 14.7 | 12.6 | 13.2 |
| m-Value | ° C. | −14.8 | −16.7 | −17.5 | −17.0 | −17.1 |
| S-Value | ° C. | −15.8 | −19.5 | −20.0 | −19.6 | −19.9 |
| 24 hr Compatibility | ° F. |  | 3.2 | 1.2 | 6.4 | 5.3 |
|  | (° C.) |  | (1.8) | (0.7) | (3.6) | (2.9) |
| 135° C. Viscosity | Pa * s |  | 1.70 | 1.85 | 1.67 | 1.68 |

Substitution of CaO for ZnO in the ZnO/MBI/TPS-32-crosslinked PMA (Blend of Example 24, Table IX) had little effect. The Compatibility was within experimental error of the results for the similar blend crosslinked with ZnO/MBI/-TPS-32 (Blend of Ex. 27, Table IX). Substitution of ZnO with an excess of Calcium Stearate resulted in a slight decrease in the compatibility properties, compared to the similar blend crosslinked with ZnO. Finally, the blend crosslinked with Zinc Stearate/MBI/TPS-32 (Ex. 26) had properties similar to the Blend crosslinked with ZnO/MBI/TPS-32 (Ex. 23); there was no benefit in substitution of Zinc Stearate for ZnO. All of the blends showed significant improvement in the PAV DSR Fail Temperature upon crosslinking with MBI and/or TPS-32.

Although CaO is cheaper than ZnO, more recent work has shown that the metal oxide may be eliminated from the crosslinker formulation, provided that excess ZnO has been added to the base asphalt for $H_2S$ emission control. CaO has not been shown to control $H_2S$ emissions.

TABLE X

FINAPRENE 401 PMA Blends for Compatibility

|  | Units | Ex. 19 | Ex. 20 | Ex. 21 |
|---|---|---|---|---|
| PG64-22 Base Asphalt | Wt % | 100 | 96 | 96 |
| FP401 | Wt % |  | 4 | 4 |
| ZnO | Wt % |  | 0.06 | 0.06 |
| MBT | Wt % |  | 0.06 |  |
| MBI | Wt % |  |  | 0.06 |
| Sulfur | Wt % |  | 0.12 |  |
| TPS-32 Polysulfide | Wt % |  |  | 0.40* |
| Binder DSR | ° C. | 66.3 | 82.5 | 81.7 |
| RTFO DSR | ° C. | 67.8 | 80.7 | 79.8 |
| PAV DSR | ° C. | 23.0 | 13.8 | 13.4 |
| m-Value | ° C. | −14.8 | −17.3 | −17.9 |
| S-Value | ° C. | −15.8 | −19.6 | −20.5 |
| 24 hr Compatibility | ° F. |  | 4.0 | 5.7 |
|  | (° C.) |  | (2.2) | (3.2) |
| 135° C. Viscosity | Pa * s |  | 2.77 | 2.01 |

PMA blends made using FINAPRENE 401 copolymer are shown in Table X. Uncrosslinked PMA modified with FP401 was incompatible with a separation of 33.8° F. (18.8° C.); the separation of the uncrosslinked FP401 PMA was significantly better than the uncrosslinked FP502 PMA with a separation of 60.2° F. (33.4° C.). The Control FP401 blend (Ex. 19), crosslinked with ZnO/MBT/S was compatible with a separation of 4.0° F. (2.2° C.) after 24 hrs. The FP401 PMA had a slightly increased 24 hr separation of 5.7° F. (3.2° C.). The MP1 grading results for the two PMA blends are statistically equivalent, although there is a distinct increase in the 135° C. Viscosity of the FP401 blend crosslinked with traditional ZnO/MBT/S.

FP401 modified blends were formulated and crosslinked with the ZnO substituted for by Calcium Stearate or Zinc Stearate, and in conjunction with MBI/TPS-32. The test results for these blends are presented in Table XI.

TABLE XI

FINAPRENE 401 PMA blends for Compatibility

|  | Units | 1 | 2 | 3 | 4 |
|---|---|---|---|---|---|
| PG64-22 Base Asphalt | Wt % | 100 | 96 | 96 | 96 |
| FP401 | Wt % |  | 4 | 4 | 4 |
| Calcium Stearate | Wt % |  | 0.06 | 0.12 |  |
| Zinc Stearate | Wt % |  |  |  | 0.12 |
| MBI | Wt % |  | 0.06 | 0.06 | 0.06 |
| TPS-32 Polysulfide | Wt % |  | 0.40* | 0.40* | 0.40* |
| Binder DSR | ° C. | 66.3 | 81.7 | 81.1 | 81.3 |
| RTFO DSR | ° C. | 67.8 | 80.0 | 79.9 | 79.7 |
| PAV DSR | ° C. | 23.0 | 13.7 | 10.3 | 13.1 |
| m-Value | ° C. | −14.8 | −17.4 | −17.3 | −17.2 |
| S-Value | ° C. | −15.8 | −21.2 | −20.5 | −20.3 |
| 24 hr Compatibility | ° F. |  | 6.7 | 4.9 | 4.0 |
|  | (° C.) |  | (3.7) | (2.7) | (2.2) |
| 135° C. Viscosity | Pa * s |  | 2.01 | 1.92 | 1.96 |

All of the blends crosslinked with either Zinc Stearate or Calcium Stearate and MBI/TPS-32 had Compatibilities in the same range as the ZnO/MBT/S FP401 Control Blend (Blend from Ex. 28, Table X). There were no differences in the properties of the FP401 PMA blends crosslinked with Zinc Stearate or Calcium Stearate compared to the FP401 PMA blend crosslinked with ZnO/MBI/TPS-32.

In conclusion, FP502 was found to be compatible with the base asphalt of Examples 1932 upon crosslinking. Crosslinker formulations with MBI and/or TPS-32 had improved compatibility. Use of TPS-32 produced PMA with improved 24 hr Compatibility. Substitution of CaO for ZnO in CaO/MBI/TPS-32 crosslinker produced FP502-modified PMA with equivalent properties. The Control FP401 blend, crosslinked with ZnO/MBT/S was compatible with a separation of 4.0° F. (2.2° C.) after 24 hrs. FP401 modified PMA, crosslinked with ZnO/MBI/TPS-32 had a 24 hr separation of 5.7° F. (3.2° C.), just outside of the 48 hr specification maximum of 4.0° F. (2.2° C.). Again, it will be appreciated that these blends are at the beginning of development and are not yet optimized. FP401-modified PMAs crosslinked with Zinc or Calcium Stearate and MBI/TPS-32 had properties equivalent to the PMA from ZnO/MBI/TPS-32.

In the foregoing specification, the methods and compositions herein have been described with reference to specific embodiments thereof, and have been demonstrated as effective in providing methods for preparing asphalt and polymer compositions with improved properties. However, it will be evident that various modifications and changes may be made to the method without departing from the broader spirit or scope of the invention as set forth in the appended claims. Accordingly, the specification is to be regarded in an illustrative rather than a restrictive sense. For example, specific combinations or amounts of asphalt, polymer, crosslinker, acid, activator, accelerator, and other components falling within the claimed parameters, but not specifically identified or tried in a particular PMA system, are anticipated and expected to be within the scope of this invention. Specifically, the method and discovery of the invention are expected to work with asphalts, polymers and crosslinkers other than those specifically exemplified herein.

What is claimed is:

1. A method for preparing asphalt and polymer compositions comprising:

heating a mixture comprising asphalt, an elastomeric polymer, mercaptobenzimidazole and a crosslinker comprising at least one alkyl polysulfide; and curing the mixture to form a polymer modified asphalt (PMA).

2. The method of claim 1, wherein the crosslinker further comprises sulfur.

3. The method of claim 1, where the crosslinker is absent elemental sulfur.

4. The method of claim 1, wherein the crosslinker is absent mercaptobenzothiazole (MBT).

5. The method of claim 1, wherein the PMA exhibits improved pressure aging vessel-dynamic shear rheometers (PAV-aged DSR) compared with an identical PMA absent the alkyl polysulfide.

6. The method of claim 1, wherein the alkyl polysulfide has the structure

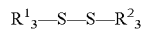

where $R^1$ and $R^2$ are independently straight, branched or cyclic alkyl groups, where $R^1$ and $R^2$ may be substituted with N, S and/or O, and the total number of carbon atoms in all $R^1$ groups is 9 or greater and the total number of carbon atoms in all $R^2$ groups is 9 or greater.

7. The method of claim 1, wherein the elastomeric polymer comprises from about 1 to 20 wt % of the asphalt/polymer mixture.

8. The method of claim 1, wherein the crosslinker is present in an amount ranging from about 0.01 to about 1 wt % based on the weight of the asphalt/polymer mixture.

9. A polymer modified asphalt (PMA) composition prepared by the method of claim 1.

10. A method of sealing a roof with the PMA comprising heating the PMA of claim 9 and distributing it over at least a portion of the roof.

11. A method of forming a road comprising combining the PMA of claim 9 with aggregate to form a road paving material; and forming a road with the road paving material.

12. A method of recycling asphalt comprising: physically removing asphalt from a location and, in any order, reducing a size of the removed asphalt; heating the removed asphalt; and adding a crosslinker to the removed asphalt, wherein the crosslinker comprises at least one alkyl polysulfide and mercaptobenzimidazole (MBI).

13. Recycled asphalt formed by the process of claim 12.

* * * * *